(12) United States Patent
Hanlon et al.

(10) Patent No.: US 7,378,177 B2
(45) Date of Patent: *May 27, 2008

(54) ELECTROCHEMICAL CELL BIPOLAR PLATE

(75) Inventors: Greg A. Hanlon, Windsor, CT (US); David E. Henderson, Guilford, CT (US)

(73) Assignee: Proton Energy Systems, Inc., Wallingford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/711,685

(22) Filed: Sep. 30, 2004

(65) Prior Publication Data

US 2006/0068265 A1 Mar. 30, 2006

(51) Int. Cl.
   *H01M 8/02* (2006.01)
(52) U.S. Cl. .......................... 429/36; 429/34; 429/35; 429/38; 429/39
(58) Field of Classification Search ................. 429/34, 429/35
   See application file for complete search history.

(56) References Cited

U.S. PATENT DOCUMENTS

| | | | |
|---|---|---|---|
| 5,441,621 A | 8/1995 | Molter et al. | 204/252 |
| 5,565,072 A * | 10/1996 | Faita et al. | 204/256 |
| 5,776,624 A | 7/1998 | Neutzler | 429/28 |
| 5,863,671 A | 1/1999 | Spear, Jr. et al. | |
| 5,879,826 A * | 3/1999 | Lehman et al. | 429/13 |
| 5,976,726 A | 11/1999 | Wilkinson | 429/35 |
| 6,017,649 A | 1/2000 | Pondo | 429/35 |
| 6,037,075 A | 3/2000 | Critz | 429/36 |
| 6,051,331 A * | 4/2000 | Spear et al. | 429/34 |
| 6,099,716 A | 8/2000 | Molter | 205/687 |
| 6,103,413 A | 8/2000 | Hilton et al. | 429/32 |
| 6,255,012 B1 | 7/2001 | Wilson et al. | 429/38 |
| 6,503,653 B2 | 1/2003 | Rock | 429/35 |
| 6,706,436 B2 | 3/2004 | Molter | 429/34 |
| 2002/0055028 A1 | 5/2002 | Ghosh et al. | 429/34 |
| 2004/0018412 A1 | 1/2004 | Orsbon et al. | |
| 2004/0197630 A1 * | 10/2004 | Wilson et al. | 429/32 |
| 2006/0014057 A1 * | 1/2006 | Ellwood et al. | 429/13 |

FOREIGN PATENT DOCUMENTS

| | | | |
|---|---|---|---|
| JP | 05-251097 | * | 9/1993 |
| WO | WO 03/063263 A2 | | 7/2003 |

OTHER PUBLICATIONS

International Search Report PCT/US2005/035265 dated Sep. 28, 2005.

* cited by examiner

*Primary Examiner*—Raymond Alejandro
*Assistant Examiner*—Cynthia Lee
(74) *Attorney, Agent, or Firm*—Cantor Colburn LLP

(57) ABSTRACT

A bipolar plate for an electrochemical cell having a first layer, a second layer, and a third layer is disclosed. The first layer has a first plurality of through channels oriented in a first direction. The second layer has a second plurality of through channels oriented in a second different direction. The third layer is disposed between and bonded to the first and second layers. The third layer has a first set of header channels in fluid communication with the first plurality of channels, and a second set of header channels in fluid communication with the second plurality of channels. A first inlet port and a first outlet port are in fluid communication with the first set of header channels, and a second inlet port and a second outlet port are in fluid communication with the second set of header channels. The bonded third layer prevents fluid communication between the first plurality of channels and the second plurality of channels.

24 Claims, 7 Drawing Sheets

ELECTROCHEMICAL CELL BIPOLAR PLATE

BACKGROUND OF INVENTION

The present disclosure relates generally to electrochemical cells, and particularly to electrochemical cells having a bipolar plate.

Electrochemical cells are energy conversion devices, usually classified as either electrolysis cells or fuel cells. A proton exchange membrane electrolysis cell can function as a hydrogen generator by electrolytically decomposing water to produce hydrogen and oxygen gas, and can function as a fuel cell by electrochemically reacting hydrogen with oxygen to generate electricity. Referring to FIG. 1, which is a partial section of a typical anode feed electrolysis cell 100, process water 102 is fed into cell 100 on the side of an oxygen electrode (anode) 116 to form oxygen gas 104, electrons, and hydrogen ions (protons) 106. The reaction is facilitated by the positive terminal of a power source 120 electrically connected to anode 116 and the negative terminal of power source 120 connected to a hydrogen electrode (cathode) 114. The oxygen gas 104 and a portion of the process water 108 exits cell 100, while protons 106 and water 110 migrate across a proton exchange membrane 118 to cathode 114 where hydrogen gas 112 is formed.

Another typical water electrolysis cell using the same configuration as is shown in FIG. 1 is a cathode feed cell, wherein process water is fed on the side of the hydrogen electrode. A portion of the water migrates from the cathode across the membrane to the anode where hydrogen ions and oxygen gas are formed due to the reaction facilitated by connection with a power source across the anode and cathode. A portion of the process water exits the cell at the cathode side without passing through the membrane.

A typical fuel cell uses the same general configuration as is shown in FIG. 1. Hydrogen gas is introduced to the hydrogen electrode (the anode in fuel cells), while oxygen, or an oxygen-containing gas such as air, is introduced to the oxygen electrode (the cathode in fuel cells). Water can also be introduced with the feed gas. The hydrogen gas for fuel cell operation can originate from a pure hydrogen source, hydrocarbon, methanol, or any other hydrogen source that supplies hydrogen at a purity suitable for fuel cell operation (i.e., a purity that does not poison the catatlyst or interfere with cell operation). Hydrogen gas electrochemically reacts at the anode to produce protons and electrons, wherein the electrons flow from the anode through an electrically connected external load, and the protons migrate through the membrane to the cathode. At the cathode, the protons and electrons react with oxygen to form water, which additionally includes any feed water that is dragged through the membrane to the cathode. The electrical potential across the anode and the cathode can be exploited to power an external load.

In other embodiments, one or more electrochemical cells may be used within a system to both electrolyze water to produce hydrogen and oxygen, and to produce electricity by converting hydrogen and oxygen back into water as needed. Such systems are commonly referred to as regenerative fuel cell systems.

Electrochemical cell systems typically include a number of individual cells arranged in a stack, with the working fluids directed through the cells via input and output conduits or ports formed within the stack structure. The cells within the stack are sequentially arranged, each including a cathode, a proton exchange membrane, and an anode. The cathode and anode may be separate layers or may be integrally arranged with the membrane. Each cathode/membrane/anode assembly (hereinafter "membrane-electrode-assembly", or "MEA") typically has a first flow field in fluid communication with the cathode and a second flow field in fluid communication with the anode. The MEA may furthermore be supported on both sides by screen packs or bipolar plates that are disposed within, or that alternatively define, the flow fields. Screen packs or bipolar plates may facilitate fluid movement to and from the MEA, membrane hydration, and may also provide mechanical support for the MEA.

In order to maintain intimate contact between cell components under a variety of operational conditions and over long time periods, uniform compression may be applied to the cell components. Pressure pads or other compression means are often employed to provide even compressive force from within the electrochemical cell.

While existing internal components are suitable for their intended purposes, there still remains a need for improvement, particularly regarding cell efficiency at lower cost, weight and size. Accordingly, a need exists for improved internal cell components of an electrochemical cell, and particularly bipolar plates, that can operate at sustained high pressures, while offering a low profile configuration.

BRIEF DESCRIPTION OF THE INVENTION

Embodiments of the invention include a bipolar plate for an electrochemical cell having a first layer, a second layer, and a third layer. The first layer has a first plurality of through channels oriented in a first direction. The second layer has a second plurality of through channels oriented in a second different direction. The third layer is disposed between and bonded to the first and second layers. The third layer has a first set of header channels in fluid communication with the first plurality of channels, and a second set of header channels in fluid communication with the second plurality of channels. A first inlet port and a first outlet port are in fluid communication with the first set of header channels, and a second inlet port and a second outlet port are in fluid communication with the second set of header channels. The bonded third layer prevents fluid communication between the first plurality of channels and the second plurality of channels.

Other embodiments of the invention include an electrochemical cell having a plurality of membrane-electrode-assemblies (MEAs) alternatively arranged with a plurality of flow field members between a first cell separator plate and a second cell separator plate, wherein the plurality of flow field members include a bipolar plate similar to that previously described.

Further embodiments of the invention include an electrochemical cell having a plurality of membrane-electrode-assemblies (MEAs) alternatively arranged with a plurality of flow field members between a first cell separator plate and a second cell separator plate. The plurality of flow field members include a bipolar plate similar to that previously describe, wherein the bipolar plate is a laminated arrangement of bonded layers that prevent fluid communication between a first fluid flow path and a second fluid flow path within the laminated arrangement.

BRIEF DESCRIPTION OF THE DRAWINGS

Referring to the exemplary drawings wherein like elements are numbered alike in the accompanying Figures.

DETAILED DESCRIPTION OF THE INVENTION

Embodiments of the invention provide a bipolar plate for an electrochemical cell, where the bipolar plate is made from three or more stamped layers that are diffusion bonded together to form a laminated arrangement. While embodiments disclosed herein describe diffusion bonding as an exemplary bonding process, it will be appreciated that the disclosed invention may also be applicable to other bonding processes, such as brazing, for example, as long as the bonded laminated arrangement is electrically conductive and provides a suitable fluid flow seal for the purposes disclosed herein. Also, while embodiments disclosed herein describe lamination layers that may be individually fabricated by stamping, it will be appreciated that the disclosed invention may also be applicable to other fabrication techniques, such as machining or laser cutting, for example.

Figure 1:
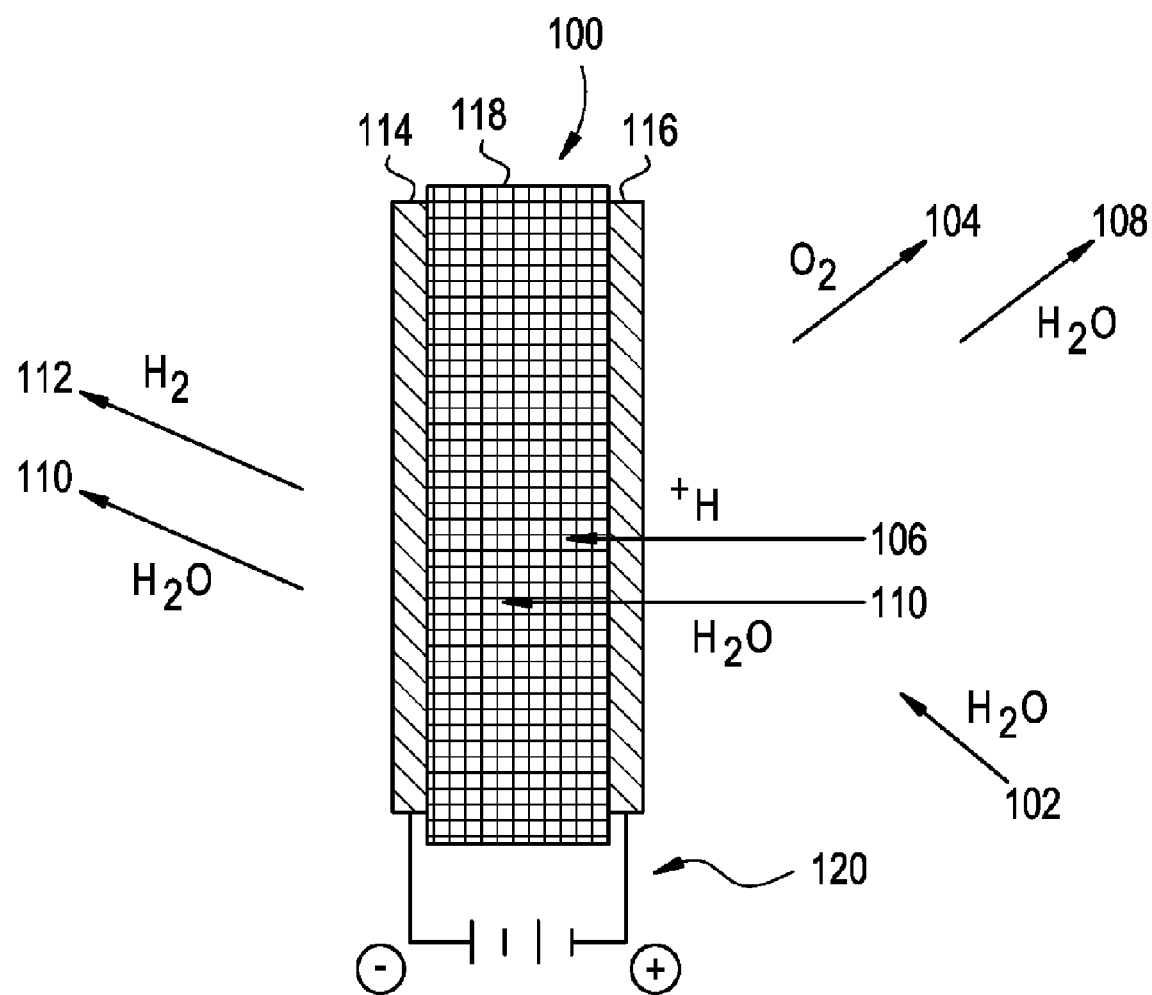
FIG. 1 depicts a schematic diagram of a partial electrochemical cell showing an electrochemical reaction for use in accordance with embodiments of the invention.
Figure 2:
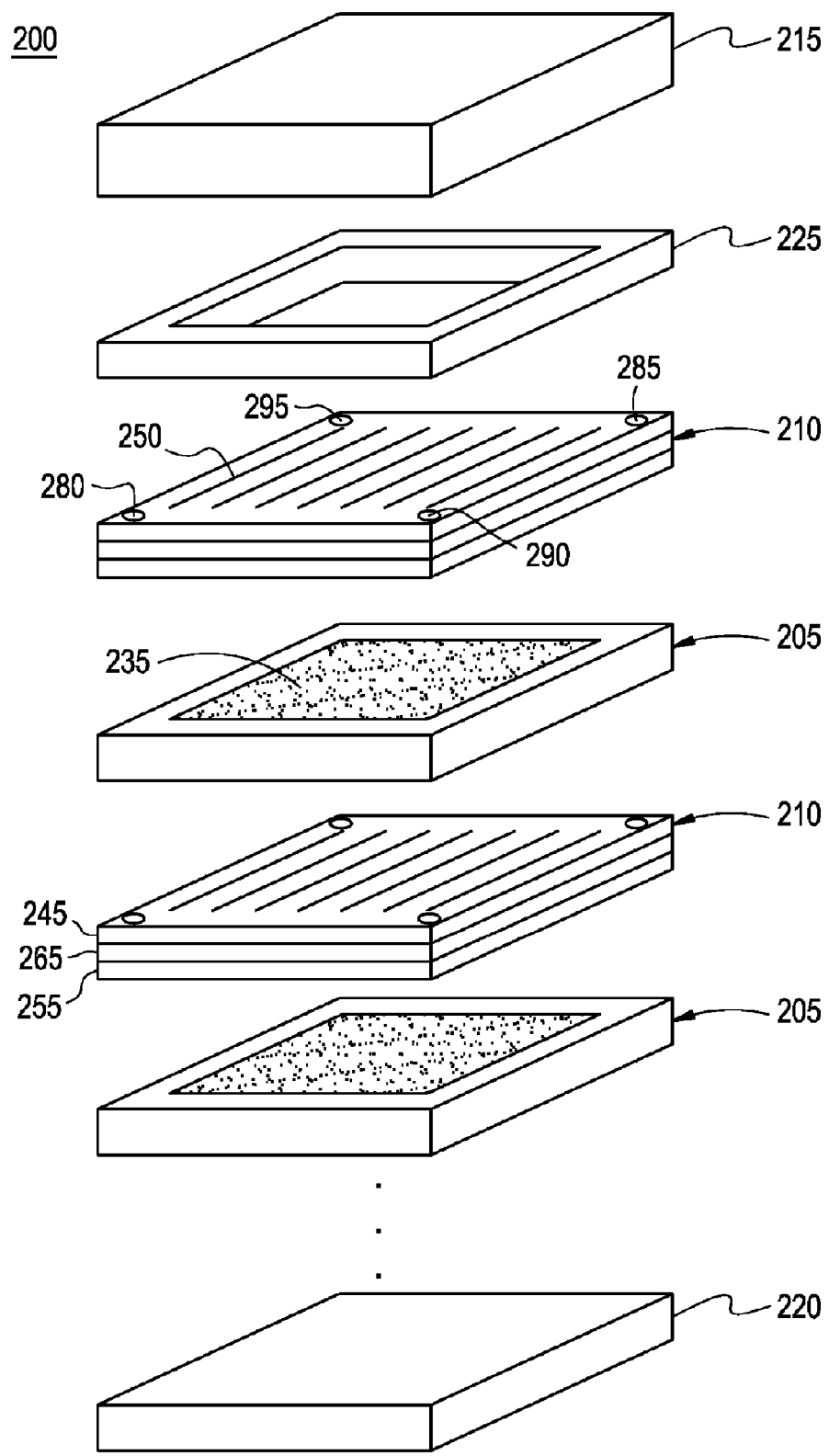
FIG. 2 depicts an exploded assembly isometric view of an exemplary electrochemical cell in accordance with embodiments of the invention.
Figure 3:
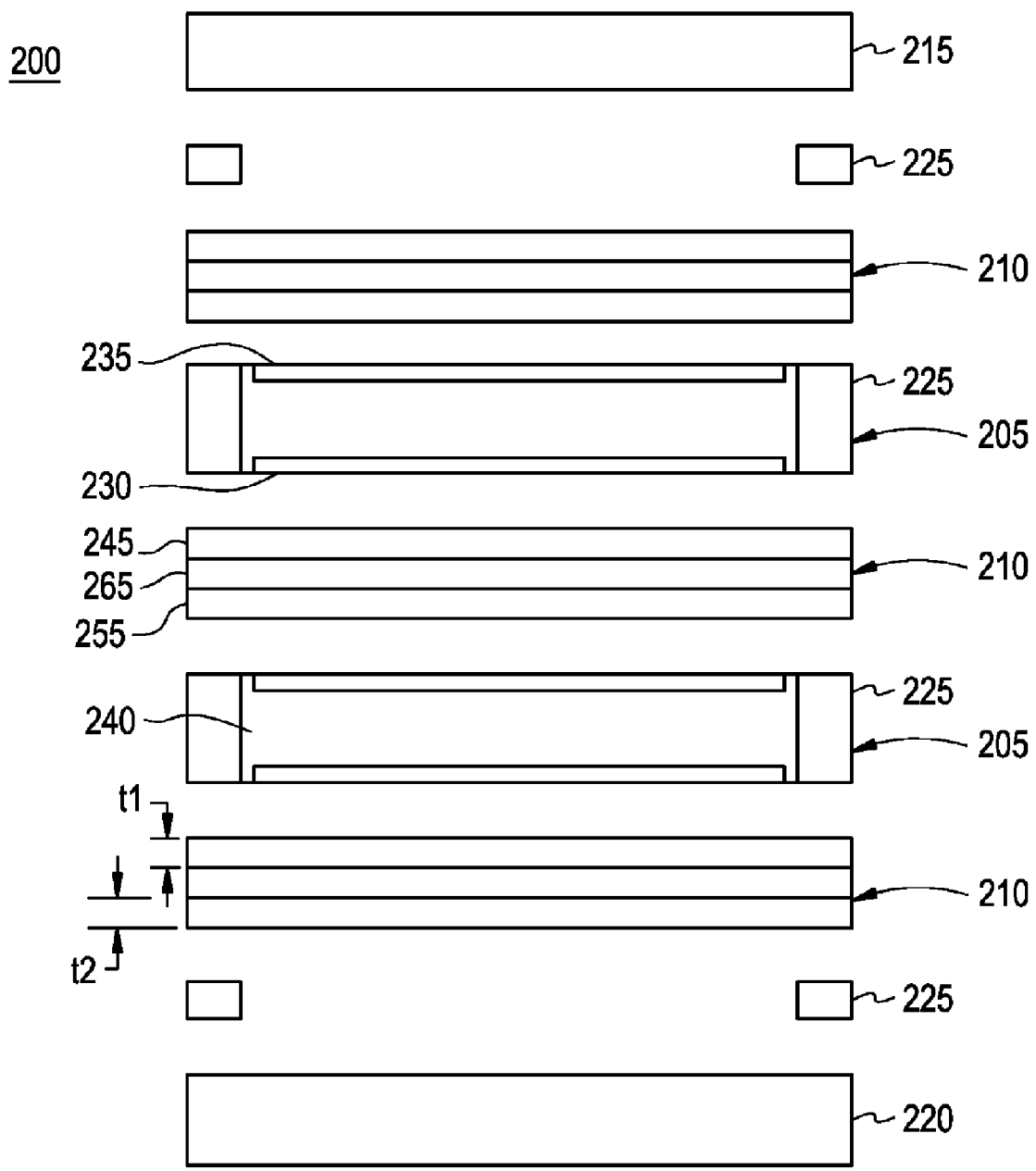
FIG. 3 depicts an exploded assembly section view similar to the assembly of FIG. 2.

Referring now to FIGS. 2 and 3, an exemplary electrochemical cell (cell) 200 that may be suitable for operation as an anode feed electrolysis cell, cathode feed electrolysis cell, fuel cell, or regenerative fuel cell is depicted in an exploded assembly isometric view. Thus, while the discussion below may be directed to an anode feed electrolysis cell, cathode feed electrolysis cells, fuel cells, and regenerative fuel cells are also contemplated. Cell 200 is typically one of a plurality of cells employed in a cell stack as part of an electrochemical cell system. When cell 200 is used as an electrolysis cell, power inputs are generally between about 1.48 volts and about 3.0 volts, with current densities between about 50 A/ft$^2$ (amperes per square foot) and about 4,000 A/ft$^2$. When used as a fuel cells power outputs range between about 0.4 volts and about 1 volt, and between about 0.1 A/ft$^2$ and about 10,000 A/ft$^2$. The number of cells within the stack, and the dimensions of the individual cells is scalable to the cell power output and/or gas output requirements. Accordingly, application of electrochemical cell 200 may involve a plurality of cells 200 arranged electrically either in series or parallel depending on the application. Cells 200 may be operated at a variety of pressures, such as up to or exceeding 50 psi (pounds-per-square-inch), up to or exceeding about 100 psi, up to or exceeding about 500 psi, up to or exceeding about 2500 psi, or even up to or exceeding about 10,000 psi, for example.

In an embodiment, cell 200 includes a plurality of membrane-electrode-assemblies (MEAs) 205 alternatively arranged with a plurality of flow field members 210 between a first cell separator plate 215 and a second cell separator plate 220. In an embodiment, flow field members 210 are bipolar plates, which are also herein referenced by numeral 210. Gaskets 225 may be employed generally for enhancing the seal between the first and second cell separator plates 215, 220 and the associated bipolar plate 210, and between MEA 205 and an adjacent bipolar plate 210.

MEA 205 has a first electrode (e.g., anode, or oxygen electrode) 230 and a second electrode (e.g., cathode, or hydrogen electrode) 235 disposed on opposite sides of a proton exchange membrane (membrane) 240, best seen by referring to FIG. 3. Bipolar plates 210, which are in fluid communication with electrodes 230 and 235 of an adjacent MEA 205, have a structure, to be discussed in more detail below, that define the flow fields adjacent to electrodes 230 and 235. The cell components, particularly cell separator plates (also referred to as manifolds) 215, 220, bipolar plates 210, and gaskets 225, may be formed with suitable manifolds or other conduits for fluid flow.

In an embodiment, membrane 240 comprises electrolytes that are preferably solids or gels under the operating conditions of the electrochemical cell. Useful materials include proton conducting ionomers and ion exchange resins. Useful proton conducting ionomers include complexes comprising an alkali metal salt, alkali earth metal salt, a protonic acid, or a protonic acid salt. Useful complex-forming reagents include alkali metal salts, alkaline metal earth salts, and protonic acids and protonic acid salts. Counter-ions useful in the above salts include halogen ion, perchloric ion, thiocyanate ion, trifluoromethane sulfonic ion, borofluoric ion, and the like. Representative examples of such salts include, but are not limited to, lithium fluoride, sodium iodide, lithium iodide, lithium perchlorate, sodium thiocyanate, lithium trifluoromethane sulfonate, lithium borofluoride, lithium hexafluorophosphate, phosphoric acid, sulfuric acid, trifluoromethane sulfonic acid, and the like. The alkali metal salt, alkali earth metal salt, protonic acid, or protonic acid salt is complexed with one or more polar polymers such as a polyether, polyester, or polyimide, or with a network or cross-linked polymer containing the above polar polymer as a segment. Useful polyethers include polyoxyalkylenes, such as polyethylene glycol, polyethylene glycol monoether, and polyethylene glycol diether; copolymers of at least one of these polyethers, such as poly(oxyethylene-co-oxypropylene) glycol, poly(oxyethylene-co-oxypropylene) glycol monoether, and poly(oxyethylene-co-oxypropylene) glycol diether; condensation products of ethylenediamine with the above polyoxyalkylenes; and esters, such as phosphoric acid esters, aliphatic carboxylic acid esters or aromatic carboxylic acid esters of the above polyoxyalkylenes. Copolymers of, e.g., polyethylene glycol with dialkylsiloxanes, maleic anhydride, or polyethylene glycol monoethyl ether with methacrylic acid are known in the art to exhibit sufficient ionic conductivity to be useful.

Ion-exchange resins useful as proton conducting materials include hydrocarbon- and fluorocarbon-type resins. Hydrocarbon-type ion-exchange resins include phenolic resins, condensation resins such as phenol-formaldehyde, polystyrene, styrene-divinyl benzene copolymers, styrene-butadiene copolymers, styrene-divinylbenzene-vinylchloride terpolymers, and the like, that are imbued with cation-exchange ability by sulfonation, or are imbued with anion-exchange ability by chloromethylation followed by conversion to the corresponding quaternary amine.

Fluorocarbon-type ion-exchange resins may include hydrates of tetrafluoroethylene-perfluorosulfonyl ethoxyvinyl ether or tetrafluoroethylene-hydroxylated (perfluoro vinyl ether) copolymers. When oxidation and/or acid resistance is desirable, for instance, at the cathode of a fuel cell, fluorocarbon-type resins having sulfonic, carboxylic and/or phosphoric acid functionality are preferred. Fluorocarbon-type resins typically exhibit excellent resistance to oxidation by halogen, strong acids and bases. One family of fluorocarbon-type resins having sulfonic acid group functionality is NAFION™ resins (commercially available from E. I. du Pont de Nemours and Company, Wilmington, Del.).

Electrodes 230 and 235 may comprise a catalyst suitable for performing the needed electrochemical reaction (i.e., electrolyzing water and producing hydrogen). Suitable catalyst include, but are not limited to, materials comprising platinum, palladium, rhodium, carbon, gold, tantalum, tungsten, ruthenium, iridium, osmium, alloys of at least one of the foregoing catalysts, and the like. Electrodes 230 and 235 may be formed on membrane 240, or may be layered adjacent to, but in contact with, membrane 240.

Figure 4:
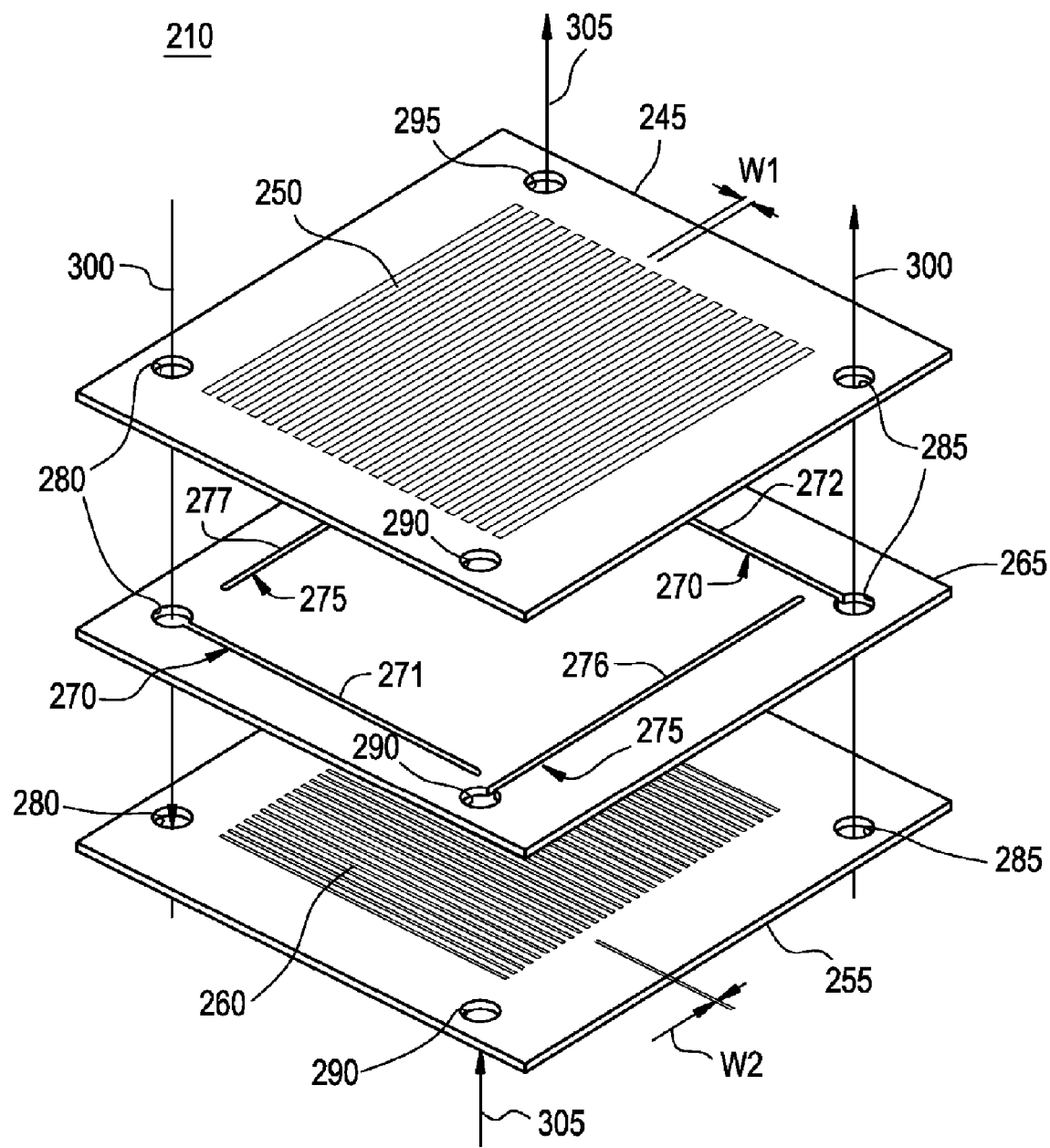
FIG. 4 depicts an exploded assembly isometric view of a bipolar plate in accordance with an embodiment of the invention.

In an embodiment, and referring now to FIG. 4, bipolar plate 210 is a laminated arrangement of three or more layers bonded together, where a first layer 245 has a first plurality of through channels 250 oriented in a first direction, a second layer 255 has a second plurality of through channels 260 oriented in a second different direction, and a third layer 265 disposed between and bonded to the first 245 and second 255 layers. The third layer 265 includes a first set of header channels 270 in fluid communication with the first plurality of channels 250, and a second set of header channels 275 in fluid communication with the second plurality of channels 260. The first set of header channels 270 includes a first through channel 271 extending from a first inlet port 280 across the ends of the first plurality of channels 250, and a second through channel 272 extending from a first outlet port 285 across the opposite ends of the first plurality of channels 250. The second set of header channels 275 includes a third through channel 276 extending from a second inlet port 290 across the ends of the second plurality of channels 260, and a fourth through channel 277 extending from a second outlet port 295 across the opposite ends of the second plurality of channels 260. As used herein, the term through channel refers to the presence of a slot or a hole that is made in the respective part (layer). As depicted in FIG. 4, the first 271, second 272, third 276, and fourth 277, through channels are all isolated from each other. Accordingly, first inlet port 280 and a first outlet port 285 are in fluid communication with the first set of header channels 270, and second inlet port 290 and second outlet port 295 are in fluid communication with the second set of header channels 275. Bipolar plate 210 may be made of niobium, zirconium, tantalum, titanium, carbon steel, stainless steel, nickel, cobalt, and associated alloys, for example.

In an embodiment, first 245, second 255, and third 265, layers are diffusion bonded together such that the first inlet port 280, the first through channel 271, the first plurality of through channels 250, the second through channel 272, and the first outlet port 285, define a first fluid flow path (flow field) 300. Similarly, the second inlet port 290, the third through channel 276, the second plurality of through channels 260, the fourth through channel 277, and the second outlet port 295, define a second fluid flow path (flow field) 305. The bonding between the first 245, second 255, and third 265, layers of bipolar plate 210 is such that fluid communication is prevented between the first fluid flow path 300 and the second fluid flow path 305.

First layer 245 has a first thickness t1, second layer 255 has a second thickness t2, each of the first plurality of channels 250 have a first width w1, and each of the second plurality of channels 260 have a second width w2. In an embodiment, first width w1 is equal to or greater than about one times the first thickness t1 and equal to or less than about three times the first thickness t1, and the second width w2 is equal to or greater than about one times the second thickness t2 and equal to or less than about three times the second thickness t2. In an alternative embodiment, the first width w1 is equal to or greater than about 1.5 times the first thickness t1, and the second width w2 is equal to or greater than about 1.5 times the second thickness t2. In an embodiment, the first width w1 is greater than the second width w2. The choice of slot-width-to-slot-width with respect to first 245 and second 255 layers may be determined by which layer is adjacent which electrode. For example, where first layer 245 is adjacent first electrode 230 (the oxygen electrode), it may be desirable to have first width w1 greater than second width w2, thereby enabling process water to easily flow through the wider slots of first flow field 300, while still enabling hydrogen gas to easily flow through the narrower slots of second flow field 305. The choice of slot-width-to-layer-thickness with respect to a given layer may be determined by the operating characteristics of cell 200. For example, at an operating pressure of equal to or greater than about 100 psi, it may be desirable to have first width w1 equal to or greater than about one times the first thickness t1 and equal to or less than about three times the first thickness t1, thereby enabling oxygen and process water to easily flow through first flow field 300 while providing sufficient support, via the remaining webbing between each slot (channel), to support the MEA 205. The same may be said for the choice of slot-width-to-layer-thickness with respect to the second layer 255, except with respect to hydrogen gas flow and MEA support.

In an embodiment, and as depicted in FIG. 4, the first direction of the first plurality of channels 250 is oriented about 90 degrees to the second direction of the second plurality of channels 260. However, embodiments of the invention are not limited to a 90 degree differential, and the scope of the invention is not intended to be so limited.

FIGS. 2 and 4 also depict first inlet port 280 and first outlet port 285 diagonally disposed with respect to a fluid flow therebetween, where the fluid flow follows an edge-to-edge flow direction as defined by the first plurality of channels 250. Similarly, second inlet port 290 and the second outlet port 295 are diagonally disposed with respect to a fluid flow therebetween. Such a diagonal arrangement of inlet and outlet ports produces a uniform flow path length from inlet to outlet, regardless of whether the fluid flow travels along the flow channel closest to the inlet port or farthest from the inlet port.

Figure 5:
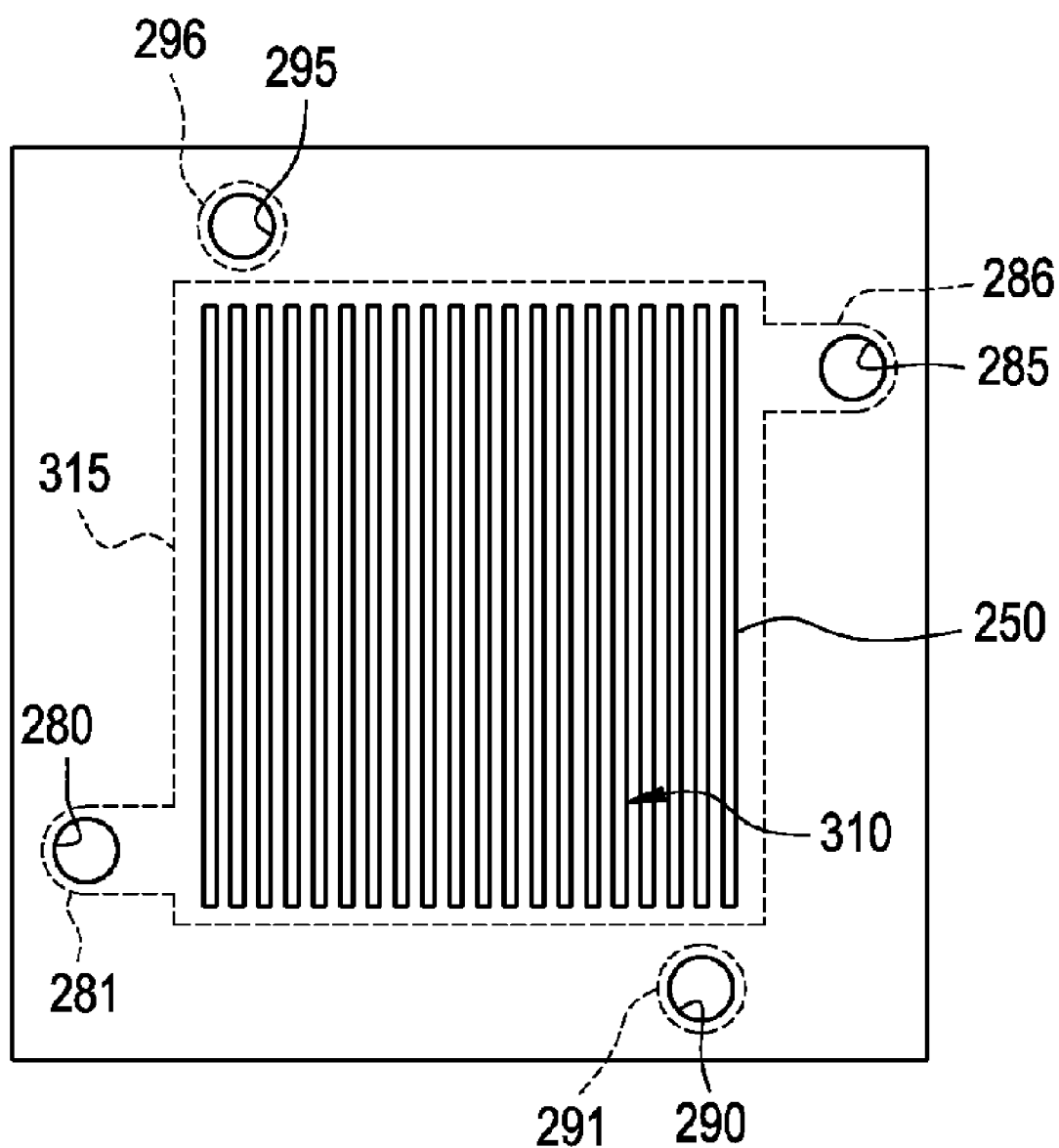
FIG. 5 depicts a plan view of an exemplary sealing arrangement for the assembly of FIG. 4.

In an embodiment, and referring now to FIG. 5, an exemplary first layer 245 of bipolar plate 210 having a first active area 310, defined by the first plurality of channels 250, is sealed to third layer 265, via diffusion bonding or other suitable means, at the perimeter 315 of first active area 310, and each inlet and outlet port 280, 285, 290, 295 is sealed to third layer 265, via diffusion bonding or other suitable means, at each respective perimeter 281, 286, 291, 296, thereby controlling fluid flow within and between each sealed region. As depicted, inlet 280 and outlet 285 ports of first layer 245 have sealing lines 281, 286 that are integral with sealing line 315 of first active area 310, thereby enabling fluid flow to pass from the port regions 280, 285 to the first set of header channels 270 and the first plurality of through channels 250, when first layer 245 is bonded to third layer 265. Although not specifically shown, it will be appreciated that a similar arrangement exists with the sealing of second layer 255 and third layer 265, thereby enabling fluid flow to pass from the port regions 290, 295 to the second set of header channels 275 and the second plurality of through channels 260.

Figure 6:
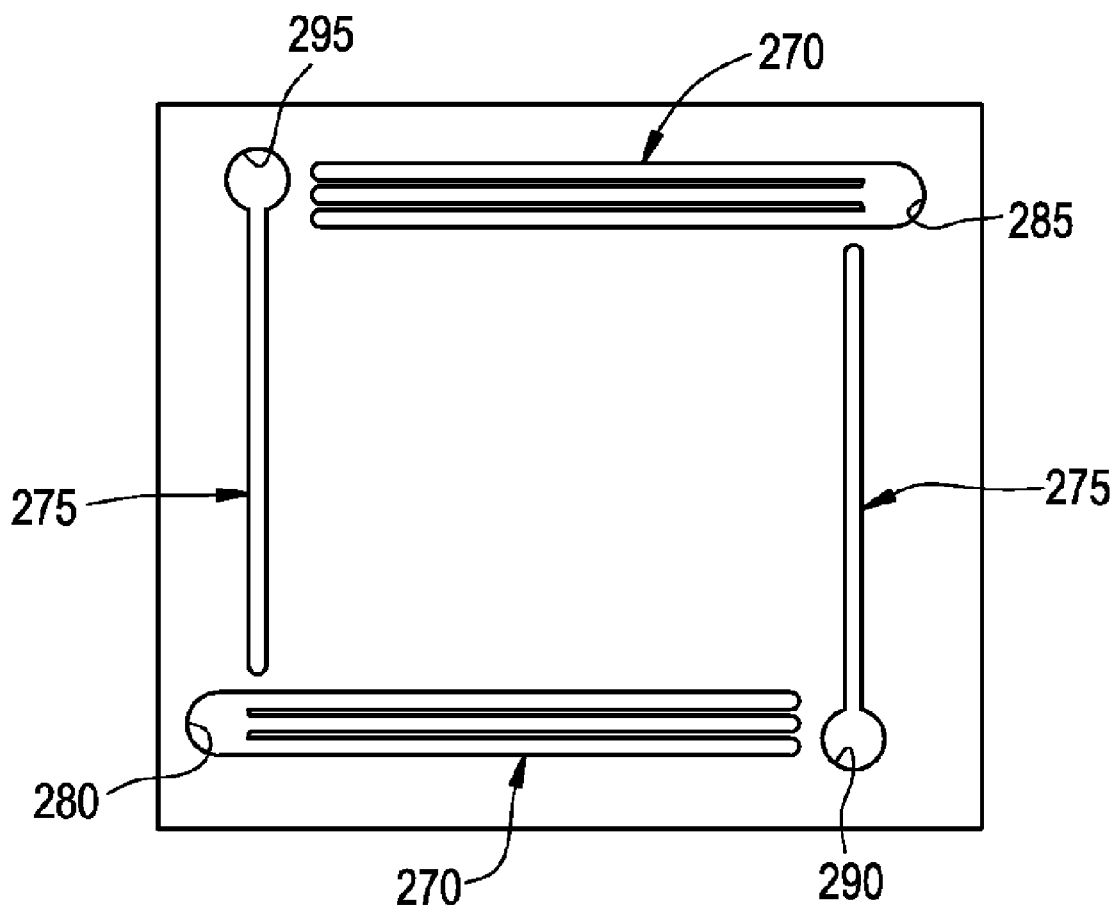
FIG. 6 depicts an alternative embodiment of a header plate for use in the assembly of FIG. 4.

An alternative embodiment for third layer 265 is depicted in FIG. 6, where the first set of header channels 270 includes a plurality of through channels and not just a single channel, such as that depicted in FIG. 4 for the first through channel 271 and the second through channel 272. The size and number of through channels that make up the first set of header channels 270, or even that make up the second set of header channels 275, are chosen for the operating characteristics of cell 200. For example, if cell 200 operates at a high pressure, the water/oxygen side of bipolar plate 210 may need three channels for the first set of header channels 270, such as that depicted in FIG. 6, in order to ensure that the localized loading in the header channel region is compatible with diffusion bonded laminations, and to ensure that a desired water flow is achieved.

Figure 7:
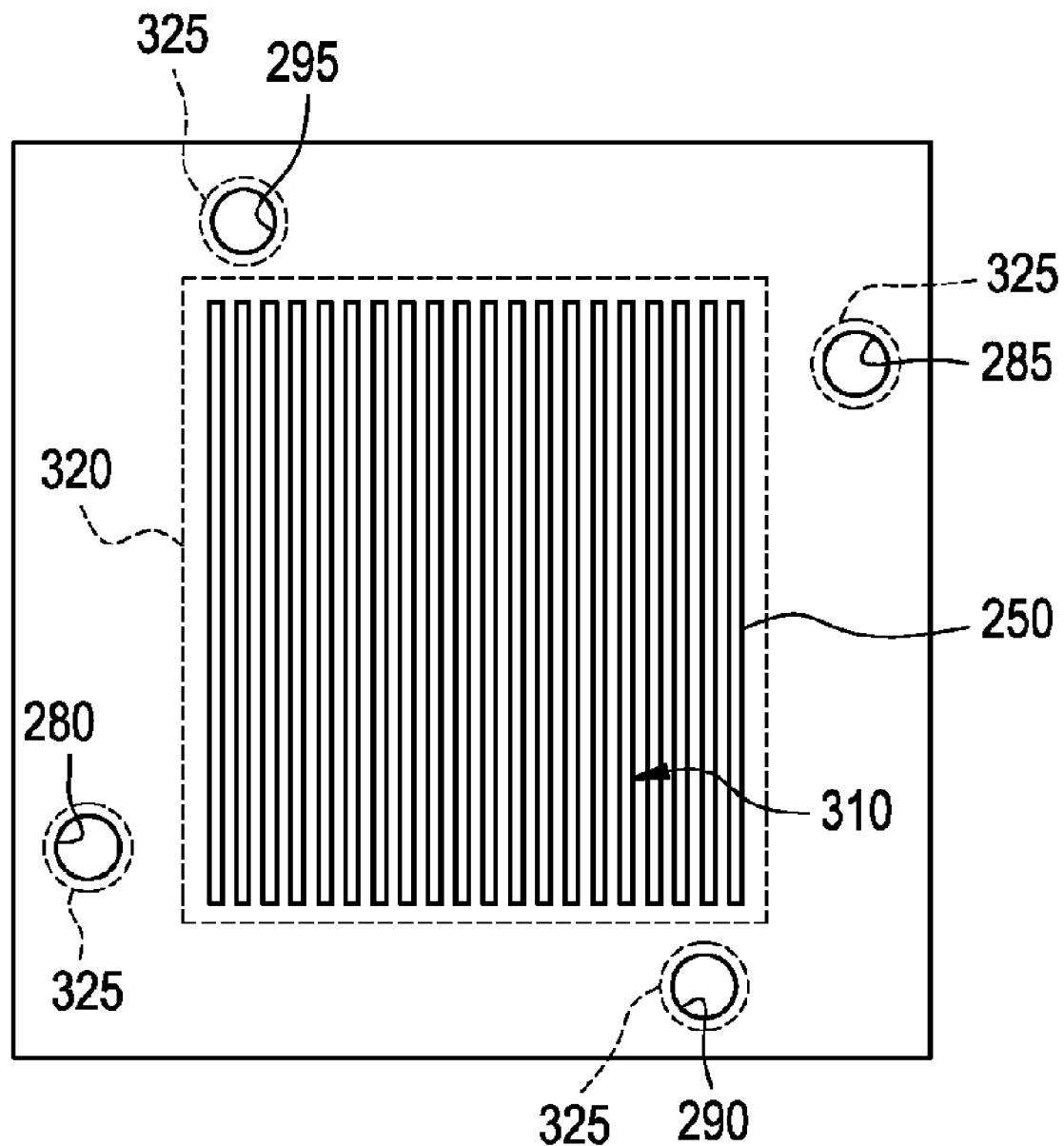
FIG. 7 depicts a plan view of a sealing arrangement in accordance with an embodiment of the invention.

Referring now to FIG. 7, a plan view of bipolar plate 210 is depicted from the side of first layer 245. Here, active area 310 is shown having a sealing line 320 around its entire perimeter, and ports 280, 285, 290, 295 are shown each having a sealing line 325 around each respective entire perimeter. Sealing lines 320 and 325 represent a seal between bipolar plate 210 and an adjacent MEA 205 that enables the use of materials less expensive than ionomers to be used to seal the fluid ports. Since the fluid header channels 270, 275 in the third layer (header plates) 265 are sealed during the diffusion bonding process, it is possible to seal the active area 310 independent of the ports 280, 285, 290, 295 when sealing with respect to the MEA 205, thereby resulting in a lower cell construction cost. While FIG. 7 depicts the sealing arrangement with respect to first layer 245 and MEA 205, it will be appreciated that the same figure may also represent the sealing arrangement with respect to second layer 255 and MEA 205, with a second active area being defined by the second plurality of channels 260.

While embodiments of the invention have been described employing a laminated bipolar plate having only three layers, it will be appreciated that the scope of the invention is not so limited, and that the invention may also apply to bipolar plates having more than three layers. Also, while embodiments of the invention have been described having a linear arrangement of a first and a second plurality of through channels in the first and the second layers, respectively, it will be appreciated that the scope of the invention is not so limited, and that the invention may also apply to pluralities of through channels having non-linear configurations. Furthermore, while embodiments of the invention have been described with single or triple through channels for the first set of header channels 270, it will be appreciated that the scope of the invention is not so limited, and that the invention may also apply to other quantities of through channels, and that the second set of header channels 275 may also have a plurality of channels.

As disclosed, some embodiments of the invention may include some of the following advantages: a low cost, compact bipolar plate that may be fabricated by low cost manufacturing methods and diffusion bonded together to provide a low profile electrochemical cell arrangement; a laminated bipolar plate arrangement that may have complex flow features and/or paths internal to the bonded laminated arrangement using low cost manufacturing techniques on each lamination; a laminated bipolar plate arrangement that may have any number of laminations depending on the desired characteristics of the cell; and, a bipolar plate arrangement that may be configured with separate sealing of the active area and the fluid port areas in order to minimize the amount of ionomer needed in the cell.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A bipolar plate for an electrochemical cell, comprising:
   a first layer having a first plurality of through-hole channels oriented in a first direction;
   a second layer having a second plurality of through-hole channels oriented in a second different direction;
   a third layer disposed between, in direct contact with, and bonded to the first and second layers, the third layer having a first set of through-hole header channels in fluid communication with the first plurality of channels, and a second set of through-hole header channels in fluid communication with the second plurality of channels;
   a first inlet port and a first outlet port in fluid communication with the first set of header channels;
   a second inlet port and a second outlet port in fluid communication with the second set of header channels;
   wherein the first layer and third layer are metallurgically bonded together to define a first bond line that encompasses the first plurality of channels, the first inlet port and the first outlet port;
   wherein the first bond line is defined by a first metallic seal disposed between the first layer and the third layer, the first metallic seal comprising material from the first layer and the third layer, the first bond line having a first portion that extends partially around the perimeter of the first plurality of channels, a second portion that extends partially around the perimeter of the first inlet port and a third portion that extends partially around the perimeter of the first outlet port, the first portion of the first bond line being integral with the second and third portions of the first bond line;
   wherein the second layer and third layer are metallurgically bonded together to define a second bond line that encompasses the second plurality of channels, the second inlet port and the second outlet port;
   wherein the second bond line is defined by a second metallic seal disposed between the second layer and the third layer, the second metallic seal comprising material for the second layer and the third layer; the second bond line having a first portion that extends partially around the perimeter of the second plurality of channels, a second portion that extends partially around the perimeter of the second inlet port and a third portion that extends partially around the perimeter of the second outlet port, the first portion of the second bond line being integral with the second and third portions of the second bond line;

wherein each of the first, second and third layers have distinguishable through-hole channels with respect to each other;

wherein the first metallic seal and the second metallic seal are disposed and configured to prevent fluid communication between the first plurality of channels and the second plurality of channels.

2. The bipolar plate of claim 1, wherein:
the first direction is oriented about 90 degrees to the second direction.

3. The bipolar plate of claim 1, wherein:
the first inlet port and the first outlet port are diagonally disposed with respect to a fluid flow therebetween; and
the second inlet port and the second outlet port are diagonally disposed with respect to a fluid flow therebetween.

4. The bipolar plate of claim 1, wherein:
the first layer has a first thickness;
each of the first plurality of channels has a first width;
the first width is equal to or greater than about the first thickness and equal to or less than about three times the first thickness;
the second layer has a second thickness;
each of the second plurality of channels has a second width; and
the second width is equal to or greater than about the second thickness and equal to or less than about three times the second thickness.

5. The bipolar plate of claim 1, wherein:
the first layer has a first thickness;
each of the first plurality of channels has a first width;
the first width is equal to or greater than about 1.5 times the first thickness;
the second layer has a second thickness;
each of the second plurality of channels has a second width; and
the second width is equal to or greater than about 1.5 times the second thickness.

6. The bipolar plate of claim 4, wherein:
the first width is greater than the second width.

7. The bipolar plate of claim 5, wherein: the first width is greater than the second width.

8. The bipolar plate of claim 1, wherein:
the first set of header channels comprises a first through-hole channel extending from the first inlet port, and a second through-hole channel extending from the first outlet port; and
the second set of header channels comprises a third through-hole channel extending from the second inlet port, and a fourth through-bole channel extending from the second outlet port.

9. The bipolar plate of claim 8, wherein:
the first, second, third, and fourth, through-hole channels are isolated from each other.

10. The bipolar plate of claim 1, wherein:
the third layer is diffusion bonded to the first and second layers.

11. The bipolar plate of claim 1, wherein:
at least one of the first set of header channels and the second set of header channels of the third layer comprises a plurality of header channels.

12. The bipolar plate of claim 1, wherein:
the first, second, and third, layers are made from titanium, zirconium, stainless steel, or any combination comprising at least one of the foregoing materials.

13. An electrochemical cell comprising:
a first cell separator plate and a second cell separator plate; and
a plurality of membrane-electrode-assemblies (MEAs) alternatively arranged with a plurality of flow field members between the first cell separator plate and the second cell separator plate;
wherein at least one of the plurality of flow field members comprises a bipolar plate, the bipolar plate comprising:
a first layer having a first plurality of through-hole channels oriented in a first direction;
a second layer having a second plurality of through-hole channels oriented in a second different direction;
a third layer disposed between, in direct contact with, and bonded to the first and second layers, the third layer having a first set of through-hole header channels in fluid communication with the first plurality of channels, and a second set of through-hole header channels in fluid communication with the second plurality of channels;
a first inlet port and a first outlet port in fluid communication with the first set of header channels;
a second inlet poll and a second outlet port in fluid communication with the second set of header channels;
wherein the first layer and third layer are metallurgically bonded together to define a first bond line that encompasses the first plurality of channels, the first inlet port and the first outlet port;
wherein the first bond line is defined by a first metallic seal disposed between the first layer and the third layer, the first metallic seal comprising material from the first layer and the third layer, the first bond line having a first portion tat extends partially around the perimeter of the first plurality of channels, a second portion that extends partially around the perimeter of the first inlet port and a third portion that extends partially around the perimeter of the first outlet port, the first portion of the first bond line being integral with the second and third portions of the first bond line;
wherein the second layer and third layer arc metallurgically bonded together to define a second bond line that encompasses the second plurality of channels, the second inlet port and the second outlet port;
wherein the second bond line is defined by a second metallic seal disposed between the second layer and the third layer, the second metallic seal comprising material for the second layer and the third layer, the second bond line having a first portion that extends partially around the perimeter of did second plurality of channels, a second portion that extends partially around the perimeter of the second inlet port and a third portion that extends partially around the perimeter of the second outlet port, the first portion of the second bond line being integral with the second and third portions of the second bond line;
wherein each of the first, second and third layers have distinguishable through-hole channels with respect to each other;
wherein the first metallic seal and the second metallic seal are disposed and configured to prevent fluid communication between the first plurality of channels and the second plurality of channels.

14. The bipolar plate of the electrochemical cell of claim 13, wherein:
the first layer has a first thickness;
each of the first plurality of channels has a first width;
the first width is equal to or greater than about the first thickness and equal to or less than about three times the first thickness;
the second layer has a second thickness;
each of the second plurality of channels has a second width; and
the second width is equal to or greater than about the second thickness and equal to or less than about three times the second thickness.

15. The bipolar plate of the electrochemical cell of claim 14, wherein:
the first width is greater than the second width.

16. The electrochemical cell of claim 15, wherein:
each MBA comprises an oxygen electrode and a hydrogen electrode; and
the first layer of the bipolar plate is proximate the oxygen electrode.

17. The bipolar plate of the electrochemical cell of claim 15, wherein:
the third layer is diffusion bonded to the first and second layers.

18. The electrochemical cell of claim 13, wherein the first plurality of through channels define a first active area, and further comprising:
a fluid flow seal about the first active area; and
a fluid flow seal about each of the inlet and outlet ports at the first layer.

19. The electrochemical cell of claim 18, wherein the second plurality of through channels of the a second active area, and further comprising:
a fluid flow seal about the second active area; and
a fluid flow seal about each of the inlet and outlet ports at the second layer.

20. An electrochemical cell comprising:
a first cell separator plate and a second cell separator plate; and
a plurality of membrane-electrode-assemblies (MEAs) alternatively arranged with a plurality of flow field members between the first cell separator plate and the second cell separator plate;
wherein at least one of the plurality of flow field members comprises a bipolar plate, the bipolar plate comprising:
first, second, and third, layers bonded together to form a laminated arrangement, the first layer having a first set of through-hole channels, the second layer having a second set of through-hole channels, and the third layer having a third and a fourth set of through-hole channels, the third layer being disposed between and in direct contact with the first and second layers;
the laminated arrangement having first and second inlet ports, and first and second outlet ports;
wherein the first layer and third layer are metallurgically bonded together to define a first bond line that encompasses the first set of channels, the first inlet port and the first outlet port;
wherein the first bond line of the laminated arrangement is defined by a first metallic seal disposed between the first layer and the third layer, the first metallic seal comprising material from the first layer and the third layer, the first bond line having a first portion that extends partially around the perimeter of the first set of through-hole channels, a second portion that extends partially around the perimeter of the first inlet port and a third portion that extends partially around the perimeter of the first outlet port, the first portion of the first bond line being integral with the second and third portions of the first bond line;
wherein the second layer and third layer are metallurgically bonded together to define a second bond line that encompasses the second set of channels, the second inlet port and the second outlet port;
wherein the second bond line of the laminated arrangement is defined by a second metallic seal disposed between the second layer and the third layer, the second metallic seal comprising material for the second lay&r and the third layer, the second bond line having a first portion that extends partially around the perimeter of the second set of through-hole channels, a second portion that extends partially around the perimeter of the second inlet port and a third portion that extends partially around the perimeter of the second outlet port, the first portion of the second bond line being integral with the second and third portions of the second bond line;
wherein the first inlet port, the first set of through-hole channels, the third set of through-hole channels, and the first outlet port, define a first fluid flow path;
wherein the second inlet port, the second set of through-hole channels, the fourth set of through-hole channels, and the second outlet port, define a second fluid flow path;
wherein each of the first, second and third layers have distinguishable through-hole channels with respect to each other;
wherein the first metallic seal and the second metallic seal of the laminated arrangement are disposed and configured to prevent fluid communication between the first fluid flow path and the second fluid flow path.

21. The bipolar plate of the electrochemical cell of claim 20, wherein:
the third layer is diffusion bonded to the first and second layers.

22. The bipolar plate of the electrochemical cell of claim 21, wherein:
the first, second, and third, layers are made from titanium, zirconium, stainless steel, or any combination comprising at least one of the foregoing materials.

23. The bipolar plate of claim 1, wherein
the first set of header channels comprises a first pair of header channels, each of the first pair extending over an opposing end of the first plurality of channels; and
the second set of header channels comprises a second pair of header channels, each of the second pair extending over an opposing end of the second plurality of channels.

24. A bipolar plate for an electrochemical cell, comprising;
a first layer having a first plurality of through-bole channels;
a second layer having a second plurality of through-hole channels;
a third layer disposed between and in direct contact with the first and second layers, the third layer having a first set of through-hole header channels in fluid communication with the first plurality of channels, and a second set of through-hole header channels in fluid communication with the second plurality of channels;

a first inlet port and a first outlet port in fluid communication with the first set of header channels;

a second inlet port and a second outlet port in fluid communication with the second set of header channels;

wherein the first layer and the third layer are metallurgically bonded together resulting in a continuous first bond line defined by a first metallic seal disposed between the first layer and the third layer, the first metallic seal comprising material from the first layer and the third layer, the continuous first bond line extending from a first location proximate the first inlet port, around a first partial perimeter of the first plurality of channels, partially around only the outside of the perimeter of the first outlet port, around a second partial perimeter of the first plurality of channels, and partially around only the outside of the perimeter of the first inlet port, and concluding at the first location; and wherein the second layer and the third layer are metallurgically bonded together resulting in a continuous second bond line defined by a second metallic seal disposed between the second layer and the third layer, the second metallic seal comprising material from the second layer and the third layer, the continuous second bond line extending from a second location proximate the second inlet port, around a first partial perimeter of the second plurality of channels, partially around only the outside of the perimeter of the second outlet port, around a second partial perimeter of the second plurality of channels, and partially around only the outside of the perimeter of the second inlet port, and concluding at the second location.

* * * * *